United States Patent Office 3,542,698
Patented Nov. 24, 1970

3,542,698
POLYMERS FROM OLEFIN OXIDES
AND SULFIDES
Joginder Lal, Akron, Ohio, assignor to The Goodyear
Tire & Rubber Company, Akron, Ohio, a corporation
of Ohio
No Drawing. Filed Aug. 9, 1968, Ser. No. 751,355
Int. Cl. C08g 23/00
U.S. Cl. 260—2
20 Claims

ABSTRACT OF THE DISCLOSURE

Olefin oxides (or sulfides) may be polymerized with a catalyst system comprised of a mixture of (A) metal alkyl (1–10C) and (B) metal alkyl thiocarbonates, metal thiocarbamates, or metal thiocarboxylates (molar ratio between .05 and 5.0). Zn or Al are the preferred metals of (A); Zn or Cd the preferred metals of (B). The resulting polymers have a higher mol. wt. than polymers produced using the catalyst materials of (B) alone.

---

This invention relates to an improved process for polymerizing olefin oxides and olefin sulfides and to the novel catayst system employed.

A variety of catalysts are known to be capable of polymerizing alkylene oxides to produce polymers. Examples of such known catalysts are metal halides, metal halide-alkylene oxide complexes, metal alkoxides and carbonates of the alkaline earth metals, and metal alkyl compounds in combination with water, organic alcohols, sulfur or oxygen. All form suitable catalysts for polymerizing alkylene oxides. More recently it has been discovered that metal alkyl thiocarbonates, metal thiocarbamates and metal thiocarboxylates act as catalysts for polymerizing olefin oxides and olefin sulfides. While the resulting polymers are suitable for many general purpose rubber applications, it is desirable for some applications such as tire tread stock to be able to produce a polymer with a higher molecular weight.

PRESENT INVENTION

Applicant has now discovered a polymerization process which comprises polymerizing at least one monomer represented by the formula

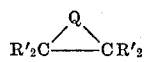

wherein Q represents oxygen or sulfur; R' represents R or hydrogen; R represents a monovalent hydrocarbon, oxyhydrocarbon, or thiohydrocarbon radical containing up to 10 carbon atoms in the presence of a catalyst comprising the mixture of a component (A) represented by the formula $MR''_n$, and a component (B) represented by the formula

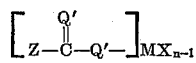

where in both (A) and (B) Z represents R, QR, or $NR'_2$; R' and Q each has the meaning previously indicated; R" represents an alkyl radical containing up to 10 carbon atoms; Q' represents sulfur or oxygen and at least one Q' in each molecule must be sulfur; M represents zinc, cadmium, magnesium, or alminum; n represents the valence of M; N represents nitrogen; and X represents any monovalent radical selected from the group consisting of halide, hydride, alkoxy, thioalkyl, hydrocarbon radical, and

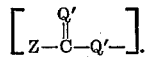

It is well known that metal alkyls are poor catalysts for polymerizing olefin oxides and olefin sulfides. Therefore, it was unexpected to discover that the addition of metal alkyls to an olefin oxide (or sulfide) monomer in the presence of the metal alkyl thiocarbonates, metal thiocarbamates and metal thiocarboxylates results in a polymer having a higher yield and/or higher molecular weight and/or higher acetone-insoluble fraction (an approximate index of molecular weight and/or stereoregularity) than is the case when the metal alkyl was omitted.

MONOMER

In its broad scope, the subject invention reveals a novel catalyst and method for polymerizing compounds broadly characterized as epoxides and episulfides, and particularly those materials known as oxirane

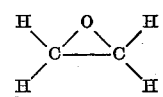

and thiirane

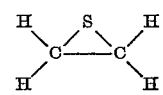

and the mono-, di-, tri- and tetrasubstituted derivatives thereof, to form elastomeric polymers. Representative examples of radicals which may be substituents of oxirane and thiirane in the practice of this invention are: alkyl (especially alkyl having up to 10 carbon atoms), alkenyl, cycloalkyl, aryl, aralkyl, alkoxyalkyl, alkenoxalkyl, alkoxy and alkenoxy radicals.

Representative examples of derivatives of oxiranes are: propylene oxide, 1-butene oxide, 2-butene oxide (cis or trans), styrene oxide, 3-phenyl-1,2-epoxypropane (benzyl ethylene oxide), 3,3,3-trifluoro-1,2-epoxypropane, epichlorohydrin, butadiene monoxide, 1,2 - epoxy - 3 - ethoxypropane, 1,2-epoxy-3-phenoxypropane, 1,2-epoxy-3-(p-chlorophenoxy) propane, 1,2-epoxy - 3 - allyloxypropane (allyl glycidyl ether), 4,5-epoxy-1-hexene, 1,1,2-trimethyl ethylene oxide, and 1,1,2,2-tetramethyl ethylene oxide.

Representative examples of substituted thiirane monomers suitable for use in practicing my invention are: propylene sulfide, 1-butene sulfide, styrene sulfide, butadiene monosulfide, 1,1,2,2-tetramethyl ethylene sulfide, and 3,3,3-trifluoro-1,2-epithiopropane.

CATALYST

The novel catalysts employed in the practice of this invention are mixtures of two components of which component (B) is a compound represented by the general formula

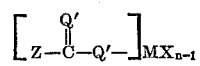

In this formula, Z, Q', M, X and n represent the elements or radicals previously indicated. Zinc and cadmium are the preferred metals M. The component (A) is a compound represented by the general formula $MR''_n$ wherein M represents the metals previously designated R" represents an alkyl radical containing up to 10 carbon atoms or hydrogen and at least one R" is an alkyl radical. Zinc and aluminum are the preferred metals M. An essential functional group in component (B) of the novel catalyst of this invention is at least one group represented by the monovalent radical

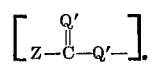

bonded to a metal represented by M. The nature of the remaining portion of the structure, represented by X supra and satisfying the unused valence(s) of M, is of relatively lesser importance and may be varied widely.

Generally, however, X will consist of monovalent radicals bonded to the metal M, examples of which include halide, hydride, alkoxy, thioalkyl, hydrocarbon radical, and

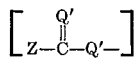

Within this definition, when X represents the radical

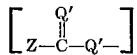

the catalyst compound would then be

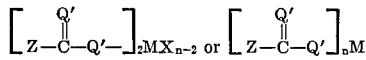

As previously indicated, Z represents a radical such as R, OR, SR, or $NR'_2$. R, in the above formula representing the catalyst component (B) of this invention, may be an alkyl (including cycloalkyl), aryl, aralkyl, alkaryl, alkenyl, alkoxyalkyl, or aryloxyalkyl radical. The alkyl radicals may be straight chain or branched, long or short. R' represents hydrogen or R.

Thus, the materials of component (B) of the catalysts of this invention encompass compounds in such chemical families as:

(I) Tautomeric monothiocarboxylates:

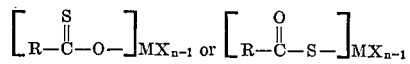

(II) Dithiocarboxylate:

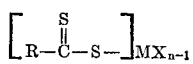

(III) Tautomeric monothiocarbonates:

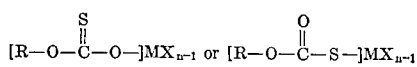

(also known as Bender's Salt)

(IV) Tautomeric dithiocarbonates:

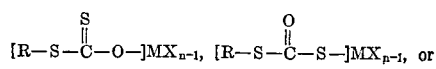

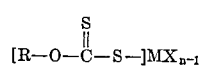

(commonly known as xanthate)

(V) Trithiocarbonate:

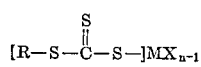

(VI) Tautomeric monothiocarbamates:

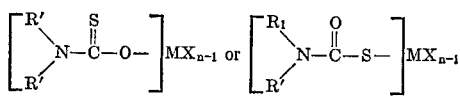

(VII) Dithiocarbamate:

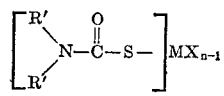

It will be obvious to those skilled in the art that the many examples given, which are represented by Z, M, and X can be intermingled in many combinations without departing from the spirit of the invention. Similarly, di- or trihydroxy compounds, di- or triamines, or di- or trithiocarboxylic acids can be used in preparing the above classes of catalyst components.

Examples of the various compounds which belong to the above-mentioned families are: zinc thiobenzoate tautomers, zinc thiobutyrate tautomers, aluminum thiobenzoate tautomers, zinc p-bromodithiobenzoate, zinc dithioisopentoate, cadmium dithioisobutyrate, zinc O-ethyl thiocarbonate tautomers, zinc S-butyl dithiocarbonate tautomers, cadmium S-propyl dithiocarbonate tautomers, zinc methyl xanthate, zinc isopropyl xanthate, zinc n-butyl xanthate, zinc tetramethylene xanthate, cadmium allyl xanthate, magnesium methyl xanthate, zinc butyl trithiocarbonate, zinc dimethylthiocarbamate tautomers, cadmium diethylthiocarbamate tautomers, zinc dithiocarbamate, zinc methyldithiocarbamate, zinc methyl ethyldithiocarbamate, zinc dimethyldithiocarbamate, zinc N-pentamethylenedithiocarbamate, aluminum dimethyldithiocarbamate, ethyl zinc dithiopropionate, ethyl magnesium dithiopropionate, ethyl zinc butyl xanthate, zinc methoxy methyl xanthate, zinc n-butoxy n-butyl xanthate, zinc allyloxy methyl xanthate, diethylaluminum thiobenzoate, etc.

The component (B) catalyst compounds disclosed in this invention and represented by the formula

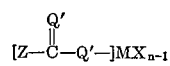

may be obtained from commercial sources or prepared by well understood techniques known to those skilled in the art.

The molar ratio of component (A) to component (B) should be in the range of .05 to 5.0. When component (B) is any one of the chemical families designated as III, IV, V, VI, or VII above, the preferred range is between .05 to .75. When component (B) is one of the chemical families designated as I or II above, the preferred range is between 2.0 and 4.0.

While the amount of catalyst employed in the practice of this invention is not critical, it is to be understood that a sufficient amount should be used to provide a catalytic effect. It has been found that satisfactory results are obtained by employing from $10^{-4}$ to 0.1 mol of catalyst per liter of monomer and that optimum desirable results are achieved when from $0.2 \times 10^{-2}$ to $3 \times 10^{-2}$ mols per liter are used.

POLYMERIZATION AND RECOVERY

In practicing this invention the reaction temperature may be varied over a wide range; for instance, from about $-50°$ to about $200°$ C., and thus is not critical. It has been found that a temperature of 0 to $100°$ C. is convenient for carrying out polymerizations.

As is well understood with reactions of this type, the reaction time generally increases with decreasing temperature, although other commonly understood factors also influence the polymerization rate. While the process may be conducted at supra-atmospheric, as well as sub-atmospheric pressures, such as are frequently utilized for polymerization reactions, it is an advantage of the subject invention that the process may be performed with good results either very near to or at atmospheric pressure.

The polymerization should generally be conducted in an inert ambient in accordance with conventional polymerization technique. Suitable for this purpose would be an atmosphere of any known inert gas, such as nitrogen, argon, helium; or a vacuum. The polymerization may also be carried out either in bulk or in an inert solvent or suspending medium. For this purpose any common aromatic, cycloaliphatic, aliphatic hydrocarbon, halogenated hydrocarbon or ether may be used. Benzene has been found to be generally suitable for this purpose.

POLYMERS

The polyepoxides and polyepisulfides produced in the practice of the subject invention are high molecular weight polymers which may be crystalline or amorphous solids, or rubbery materials. In addition to the polymers formed by polymerizing monomers of the general type disclosed, the catalyst of the subject invention may be used to form saturated copolymers thereof as well as unsaturated, vulcanizable copolymers. Examples of the saturated copolymers would be copolymers of ethylene oxide and propylene oxide or ethylene sulfide and propylene sulfide. A vulcanizable polymer would result, for example, from polymerizing allyl glycidyl ether and propylene oxide monomers; or vinyl cyclohexene oxide and 1-butene oxide monomers; or cyclooctadiene monoxide and propylene oxide monomers; or by dicyclopentadiene monoxide and proylene oxide monomers. Other examples of the sulfide copolymers would result from the copolymerization of butadiene monosulfiide and propylene sulfide. An example of a halosubstituted copolymer is that formed by the copolymerization of epichlorohydrin and propylene oxide. More complicated interpolymers are also envisioned as falling under the scope of this invention. For example, to control crystallinity, to improve vulcanizability or otherwise modify and improve the polymers made by this process, it may be beneficial to use one or more than one saturated epoxide monomer in conjunction with one or more unsaturated epoxide monomers; e.g. the product obtained by copolymerizing ethylene oxide, propylene oxide and allyl glycidyl ether monomers; or propylene oxide, styrene oxide and allyl glycidyl ether monomers; or propylene oxide, allyl glycidyl ether and vinyl cyclohexene oxide monomers.

The elastomers produced by applicant's invention may be compounded and processed by normal procedures known in the art. They are readily compounded with fillers such as carbon black and with antioxidants and other conventional compounding materials. The unsaturated elastomers are readily vulcanized with the aid of conventional sulfur plus accelerator vulcanizing systems appropriate for the degree of unsaturation in the elastomer.

EXAMPLES

The practice of this invention is illustrated by reference to the following examples which are intended to be representative rather than restrictive of its scope.

As employed in this specification "inherent viscosity" $\{\eta\}$ is defined as the natural logarithm of the relative viscosity at 30° C. divided by the polymer concentration for an 0.05 to 0.10 percent (w./v.) solution in benzene containing 0.1 percent phenyl 2-naphthylamine (PBNA) stabilizer, and expressed in units of dl./g. Percent insolubility in acetone was determined at 25° C. after immersion in acetone for 72 hours by placing one gram of sample in 200 ml. of acetone. The acetone solvent was changed after 24, 48, and 72 hours. The swollen sample was subsequently dried under vacuum to determine the insoluble fraction.

Unless stated otherwise, all polymerization reactions were conducted in a nitrogen atmosphere according to the following general procedure wherein all parts are by weight unless otherwise noted. Into a clean, dry, glass bottle flushed with nitrogen was added the required amount of component (B) followed by transfer of monomer, solvent, and component (A) through a serum cap; or the component (B) was introduced as a solution in benzene to the mixture of monomer, solvent, and component (A). Thereafter, the serum cap was replaced by a metal cap and the bottle was tumbled in a 50° C. water bath for the designated time period. Polymerization was terminated by the addition of 20 parts of methanol containing 0.2 percent PBNA stabilizer. The resultant polymer was initially aspirator dried for 24 hours and subsequently dried under 2 mm. torr for approximately 68 hours at 40° C. Where the polymer is insoluble in methanol, as for instance in the case of the butene oxide or styrene oxide polymers, the polymerization mixture was precipitated in excess methanol containing 0.2 percent PBNA followed by the drying procedure outlined above. In the examples to follow, the polymer yields have not been corrected for catalyst residues.

EXAMPLE 1

A 40 ml. portion of propylene oxide (33.2 grams) was bulk polymerized with 0.42 gram of recrystallized zinc n-butyl xanthate (64 hours at 50° C.). The yield of the polymer was 99 percent. It had an inherent viscosity of 3.7 and contained 18 percent acetone-insoluble fraction having inherent viscosity of 6.0. The polymerization was repeated using in addition 0.20 ml. of 1.94 molar diethylzinc solution in heptane (molar ratio of diethylzinc to zinc butyl xanthate=0.34:1). The order of addition was: zinc butyl xanthate, propylene oxide, diethylzinc. The yield of the polymer was quantitative. The polymer had an inherent viscosity of 5.9 and acetone-insolubility of 23 percent. The acetone-insoluble fraction had an inherent viscosity of 8.4. These data demonstrate that polymerization in the presence of zinc butyl xanthate-diethylzinc system yields poly (propylene oxide) having a higher inherent viscosity and a higher percentage of acetone-insoluble fraction of higher inherent viscosity than the corresponding values obtained when diethylzinc is omitted.

EXAMPLES 2–6

The effect of molar ratio of diethylzinc to zinic n-butyl xanthate on the yield of poly (propylene oxide) and some of its properties is shown in Table I. The order of addition was: propylene oxide, benzene, zinc n-butyl xanthate solution in benzene, and diethylzinc solution (as indicated). It is apparent that the yield of the polymer is reduced drastically at molar ratios of 0.75 and higher. The polymer obtained at the ratio 0.5:1 has higher inherent viscosity and greater acetone-insoluble fraction than the polymer obtained in the absence of diethylzinc.

EXAMPLES 7–10

In these examples, the effect of adding diethylzinc is shown on the polymerization of propylene oxide with recrystallized cadmium pentamethylenedithiocarbamate and zinc dimethyldithiocarbamate catalysts. The order of addition was: metal dithiocarbamate, propylene oxide, benzene, diethylzinc solution (as indicated). The data are shown in Table II. The polymer in Example 8 was obtained in a higher yield and has higher inherent viscosity and greater acetone-insoluble fraction than the polymer in Example 7 which did not employ diethylzinc. Similarly, the polymer in Example 10 was obtained in a significantly higher yield in the presence of diethylzinc than the polymer in Example 9.

TABLE I.—POLYMERIZATION OF PROPYLENE OXIDE WITH ZINC N-BUTYL XANTHATE: EFFECT OF ADDITION OF DIETHYLZINC

| | Ml. of 1.9 molar diethylzinc | Ml. of benzene | Molar ratio [1] | Polymer yield, percent | Inherent viscosity | Acetone-insoluble, percent |
|---|---|---|---|---|---|---|
| Example No.: | | | | | | |
| 2 | 0 | 5.0 | 0 | 92 | 2.2 | 13.6 |
| 3 | 0.218 | 4.78 | 0.25 | 94 | 3.0 | 14.0 |
| 4 | 0.436 | 4.56 | 0.5 | 40 | 5.8 | 20.2 |
| 5 | 0.654 | 4.34 | 0.75 | 6.0 | ([2]) | ([2]) |
| 6 | 0.872 | 4.13 | 1.0 | 5.6 | ([2]) | ([2]) |

[1] Diethylzinc/zinc n-butyl xanthate molar ratio.
[2] Not determined.

Conditions: 33.2 g. (40 ml.) propylene oxide, benzene and diethylzinc solution as indicated, 10 ml. zinc n-butyl xanthate solution in benzene (0.60 g., 1.65 millimoles). Total volume 55.0 ml. Polymerization of 50° C. for 23 hours.

with 0.84 gram of zinc n-butyl xanthate (in 14 ml. benzene) and 3.27 ml. of 0.19 molar diethylzinc solution (in benzene) to give 52.3 grams of a copolymer, inherent viscosity 1.8. The molar ratio of diethylzinc to zinc n-

TABLE II.—POLYMERIZATION OF PROPYLENE OXIDE WITH METAL DITHIOCARBAMATES: EFFECT OF ADDITION OF DIETHYLZINC

| Example No: | Ml. of 0.19 molar diethylzinc | Benzene, ml. | Catalyst, g. | Polymer yield, percent | Inherent viscosity | Acetone-insoluble, percent |
|---|---|---|---|---|---|---|
| 7 | 0 | 6.0 | Cadmium pentamethylenedithiocarbamate 0.6 | 79 | 2.3 | 7.2 |
| 8 | 1.65 | 4.35 | ___do___ | 91 | 4.0 | 15.6 |
| 9 | 0 | 6.0 | Zinc dimethyldithiocarbamate 0.6 | 12 | (1) | (1) |
| 10 | 2.6 | 3.4 | ___do___ | 29 | (1) | (1) |

[1] Not determined.

Conditions: 33.2 g. propylene oxide (40 cc.), benzene and diethylzinc solution as indicated. Total volume=46.0 ml. Molar ratio of diethylzinc to metal dithiocarbamate in Examples 7 and 9 was 0.23:1 and 0.25:1, respectively. Polymerization at 50° C. Polymerization time was 42 hours for Examples 7 and 8 and 28 hours for Examples 9 and 10.

EXAMPLE 11

A 40 ml. portion of dried 1,2-butene oxide (33.3 grams) was polymerized (17 hours, 50° C.) with 0.42 gram of zinc n-butyl xanthate contained in 10 ml. benzene. The polymer was precipitated in excess methanol containing a little PBNA stabilizer and dried. A rubbery product, 8.5 grams, inherent viscosity 2.6, was obtained. The polymerization experiment was repeated using in addition 0.1 ml. of 1.0 molar triisobutylaluminum in benzene (molar ratio of triisobutylaluminum/zinc n-butyl xanthate=0.086:1). The order of addition was: monomer, xanthate solution, triisobutylaluminum. The yield of the polymer was 7.7 grams. It has a significantly higher inherent viscosity of 5.6 than the polymer prepared in the absence of the triisobutylaluminum.

EXAMPLES 12–17

To determine the effect of molar ratio of diethylzinc to zinc thiobenzoate on the polymerization of propylene oxide, diethylzinc solution in varying amounts was injected into solution of zinc thiobenzoate in propylene oxide through which nitrogen had been passed to remove air. The data are shown in Table III. It is apparent that maximum yield of the polymer is obtained at the molar ratio of 2:1.

TABLE III.—POLYMERIZATION OF PROPYLENE OXIDE WITH ZINC THIOBENZOATE: EFFECT OF ADDITION OF DIETHYLZINC

| Example no.: | Ml. of 1.9 molar diethylzinc | Molar ratio [a] | Polymer yield, percent |
|---|---|---|---|
| 12 | 0 | 0 | 3.0 |
| 13 | 0.87 | 1 | 3.5 |
| 14 | 1.75 | 2 | 9.7 |
| 15 | 2.62 | 3 | 5.7 |
| 16 | 3.50 | 4 | 6.0 |
| 17 | 4.37 | 5 | 6.7 |

[a] Diethylzinc/zinc thiobenzoate molar ratio.

Conditions: 33.2 g. propylene oxide, 0.56 g. zinc thiobenzoate, diethylzinc solution as indicated. Polymerization at 50° C. for 25 hours.

EXAMPLE 18

A mixture of 54.0 grams of propylene oxide and 6.0 grams of allyl glycidyl ether was polymerized at 50° C.

butyl xanthate was 0.22:1. The copolymer was compounded according to the following recipe:

|  | Wt. parts |
|---|---|
| Copolymer | 100 |
| Stearic Acid | 3 |
| Zinc oxide | 5 |
| Sulfur | 2 |
| Tuads [1] | 1 |
| Tellax [2] | 0.5 |

[1] Tetramethylthiuramdisulfide.
[2] Telluriumdiethyldithiocarbamate.

On curing at 310° F. for 30 minutes, a rubbery product was obtained. Its swelling ratio in toluene was 5.9 (grams of solvent per gram of vulcanizate).

While certain representative embodiments and details have been shown for the purpose of illustrating the invention, it will be apparent to those skilled in the art that various changes and modifications may be made therein without departing from the spirit or scope of the invention.

What is claimed is:
1. The process consisting of:
(I) Polymerizing at least one monomer with the formula

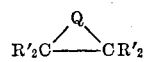

wherein
(i) Q represents oxygen or sulfur;
(ii) R' represents R or hydrogen;
(iii) R represents a monovalent hydrocarbon, oxyhydrocarbon, or thiohydrocarbon radical containing up to 10 carbon atoms
(II) In the presence of a catalyst comprising a mixture of component (A), a compound represented by the formula

and component (B), a compound represented by the formula

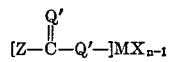

wherein in (A) and (B)
(i) Z represents R, QR, or NR'$_2$;
(ii) R', R and Q each has the meaning indicated in I above;
(iii) R'' represents an alkyl radical containing up to 10 carbon atoms or hydrogen and at least one R'' is an alkyl radical;
(iv) Q' represents sulfur or oxygen and at least one Q' in each molecule must be sulfur;

(v) M represents Zn, Cd, Mg, or Al;
(vi) n represents the valence of M;
(vii) N represents nitrogen;
(viii) X represents a monovalent radical selected from the group consisting of halide, hydride, alkoxy, thioalkyl, hydrocarbon radical, and

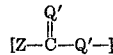

and wherein
(1) the molar ratio of (A) to (B) is between .05 and 5.0, and
(2) the polymerization reaction temperature is between about −50° and 200° C., and
(3) the polymerization is conducted in an inert atmosphere.

2. The process of claim 1 wherein component (B) is a metal alkyl thiocarbonate and the molar ratio of (A) to (B) is between .05 and .75.

3. The process of claim 1 wherein component (B) is a metal thiocarbamate and the molar ratio of (A) to (B) is between .05 and .75.

4. The process of claim 1 wherein component (B) is a metal thiocarboxylate and the molar ratio of (A) to (B) is between 2.0 and 4.0.

5. The process of claim 2 wherein the metal of component (B) is zinc or cadmium and the metal of component (A) is zinc or aluminum.

6. The process of claim 3 wherein the metal of component (B) is zinc or cadmium and the metal of component (A) is zinc or aluminum.

7. The process of claim 4 wherein the metal of component (B) is zinc or cadmium and the metal of component (A) is zinc or aluminum.

8. The process of claim 1 wherein component (B) is zinc alkyl xanthate, component (A) is dialkylzinc or trialkyl aluminum, and the molar ratio of (A) to (B) is between .05 and .75.

9. The process of claim 1 wherein component (B) is zinc dimethyldithiocarbamate, component (A) is dialkyl zinc or trialkyl aluminum, and the molar ratio of (A) to (B) is between .05 and .75.

10. The process of claim 1 wherein component (B) is zinc thiobenzoate, component (A) is dialkylzinc or trialkyl aluminum, and the molar ratio of (A) to (B) is between 2.0 and 4.0.

11. The process of claim 1 wherein component (B) is zinc n-butyl xanthate, component (A) is diethyl zinc or triisobutylaluminum, and the molar ratio of (A) to (B) is between .05 and .75.

12. A catalyst composition of matter consisting of a mixture of:
component (A), consisting of a compound represented by the formula $MR''_n$, and
component (B), consisting of a compound represented by the formula

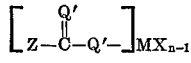

wherein in (A) and (B)
(i) Z represents R, QR, or $NR'_2$;
(ii) R' represents R or hydrogen;
(iii) R represents a monovalent hydrocarbon, oxyhydrocarbon, or thiohydrocarbon radical containing up to 10 carbon atoms;
(iv) Q represents oxygen or sulfur;
(v) R'' represents an alkyl radical containing up to 10 carbon atoms or hydrogen and at least one R'' is an alkyl radical;
(vi) Q' represents sulfur or oxygen and at least one Q' in each molecule must be sulfur;
(vii) M represents Zn, Cd, Mg, or Al;
(viii) n represents the valence of M;
(ix) N represent nitrogen;
(x) X represents a monovalent radical selected from the group consisthing of halide, hydride, alkoxy, thioalkyl, hydrocarbon, and

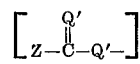

and wherein the molar ratio of (A) to (B) is between .05 and 5.0.

13. The composition of claim 12 wherein component (B) is a metal alkyl thiocarbonate and the molar ratio of (A) to (B) is between .05 and .75.

14. The composition of claim 12 wherein component (B) is a metal thiocarbamate and the molar ratio of (A) to (B) is between .05 and .75.

15. The composition of claim 12 wherein component (B) is a metal thiocarboxylate and the molar ratio of (A) to (B) is between 2.0 and 4.0.

16. The composition of claim 13 wherein the metal of component (B) is zinc or cadmium and the metal of component (A) is zinc or aluminum.

17. The composition of claim 14 wherein the metal of component (B) is zinc or cadmium and the metal of component (A) is zinc or aluminum.

18. The composition of claim 15 wherein the metal of component (B) is zinc or cadmium and the metal of component (A) is zinc or aluminum.

19. The composition of claim 13 wherein component (B) is zinc alkyl xanthate, component (A) is dialkylzinc or trialkylaluminum, and the molar ratio of (A) to (B) is between .05 and .75.

20. The composition of claim 13 wherein component (B) is zinc n-butyl xanthate, component (A) is diethylzinc or triisobutylaluminum, and the molar ratio of (A) to (B) is between .05 and .75.

References Cited

UNITED STATES PATENTS

| | | | |
|---|---|---|---|
| 3,329,659 | 7/1967 | Gobran et al. | 260—79 |
| 3,409,565 | 11/1968 | Lal | 260—2 |
| 3,422,034 | 1/1969 | Calderon | 260—2 |

HOSEA E. TAYLOR, Primary Examiner

M. I. MARQUIS, Assistant Examiner

U.S. Cl. X.R.

252—431; 260—37, 79, 79.7

PO-1050
(5/69)

UNITED STATES PATENT OFFICE
CERTIFICATE OF CORRECTION

Patent No. 3,542,698      Dated November 24, 1970

Inventor(s) Joginder Lal

It is certified that error appears in the above-identified patent and that said Letters Patent are hereby corrected as shown below:

Column 1, line 25, "catayst" should read -- catalyst --; line 64, "alminum" should read -- aluminum --. Column 2, line 29, "alkenoxalkyl" should read -- alkenoxyalkyl --; line 59, after "designated" should be inserted a comma. Column 3, line 14, that portion of the formula reading $C - Q']_nM$    should read    $C - Q' -]_nM$ column 3, line 53, under formula (VI), that portion reading

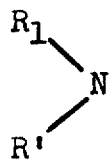    should read    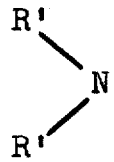

column 3, line 60, formula (VII), that portion reading

    should read    

Column 4, line 30, "familities" should read -- families --.
Column 5, line 3, "polymer" should read -- copolymer --.
Column 6, line 37, "zinic" should read -- zinc --; Table I, the title should read -- POLYMERIZATION OF PROPYLENE OXIDE v ZINC n-BUTYL XANTHATE: EFFECT OF ADDITION OF DIETHYLZINC --
Column 7, line 4, "of" should read -- at --. Column 9, line in Claim 1, "a bout" should read -- about --. Column 10, li 15, in Claim 12, "consisthing" should read -- consisting --.

Signed and sealed this 30th day of March 1971.

(SEAL)
Attest:

EDWARD M. FLETCHER, JR.
Attesting Officer

WILLIAM E. SCHUYLER,
Commissioner of Pate